United States Patent
Kim et al.

(10) Patent No.: US 11,636,023 B2
(45) Date of Patent: Apr. 25, 2023

(54) SCHEME FOR TEST AUTOMATION

(71) Applicant: SETA LAB, INC., Seoul (KR)

(72) Inventors: Jungok Kim, Seoul (KR); Sujung Moon, Gimpo (KR)

(73) Assignee: SETA LAB, INC., Seoul (KR)

( * ) Notice: Subject to any disclaimer, the term of this patent is extended or adjusted under 35 U.S.C. 154(b) by 486 days.

(21) Appl. No.: 16/619,449

(22) PCT Filed: Oct. 4, 2018

(86) PCT No.: PCT/KR2018/011730
§ 371 (c)(1),
(2) Date: Dec. 4, 2019

(87) PCT Pub. No.: WO2019/117438
PCT Pub. Date: Jun. 20, 2019

(65) Prior Publication Data
US 2020/0159649 A1    May 21, 2020

(30) Foreign Application Priority Data
Dec. 16, 2017 (KR) ................. 10-2017-0173705

(51) Int. Cl.
*G06F 11/36* (2006.01)
*G06F 16/958* (2019.01)
*G06F 9/54* (2006.01)

(52) U.S. Cl.
CPC ......... *G06F 11/3664* (2013.01); *G06F 9/541* (2013.01); *G06F 11/3684* (2013.01); *G06F 11/3688* (2013.01); *G06F 16/986* (2019.01)

(58) Field of Classification Search
CPC .. G06F 9/541; G06F 11/3664; G06F 11/3684; G06F 11/3688; G06F 16/986
See application file for complete search history.

(56) References Cited

U.S. PATENT DOCUMENTS

| | | | | |
|---|---|---|---|---|
| 6,732,330 B1 * | 5/2004 | Claussen | ............... | G06F 16/986 |
| | | | | 707/E17.118 |
| 7,552,424 B1 * | 6/2009 | Bischof | ................ | G06F 11/006 |
| | | | | 714/39 |

(Continued)

FOREIGN PATENT DOCUMENTS

| | | |
|---|---|---|
| CN | 102306122 A | 1/2012 |
| JP | 2006085356 A | 3/2006 |

(Continued)

OTHER PUBLICATIONS

Chen et al., "A Selenium based Approach to Automatic Test Script Generation for Refactoring JavaScript Code", published by IEEE, pp. 341-346 (Year: 2013).*

(Continued)

*Primary Examiner* — S. Sough
*Assistant Examiner* — Zheng Wei (57) ABSTRACT

A method performed on a test automation platform by a computing device is disclosed. The disclosed method comprises: a step of generating the markup language document from a test script (the test script is created in a script language so as to include the definition of a user-defined function for use in testing a device under test (DUT) and a markup language document includes a script element for inserting the definition of the user-defined function into the markup language document); and a step of running a program engine (the program engine is an existing component of the test automation platform and includes an interpreter for the script language) in order to process the created markup language document.

17 Claims, 8 Drawing Sheets

(56) References Cited

U.S. PATENT DOCUMENTS

| | | | |
|---|---|---|---|
| 9,122,789 B1* | 9/2015 | Massa | G06F 11/263 |
| 2002/0083213 A1* | 6/2002 | Oberstein | G06F 11/3684 |
| | | | 714/E11.207 |
| 2009/0037881 A1* | 2/2009 | Christy | G06F 11/3664 |
| | | | 717/124 |
| 2009/0300646 A1* | 12/2009 | Wagner | G06F 9/541 |
| | | | 719/312 |
| 2012/0246619 A1* | 9/2012 | Thirumalai | G06F 11/3664 |
| | | | 717/124 |
| 2012/0311541 A1* | 12/2012 | Bullard | G06F 11/368 |
| | | | 717/127 |
| 2014/0317489 A1* | 10/2014 | Lal | G06F 40/14 |
| | | | 715/234 |
| 2015/0309916 A1* | 10/2015 | Chen | H04W 4/18 |
| | | | 717/125 |
| 2017/0103140 A1* | 4/2017 | Zhang | G06F 16/9577 |
| 2017/0147414 A1* | 5/2017 | Ito | G06F 9/541 |
| 2021/0224349 A1* | 7/2021 | Zhang | G06F 11/3612 |

FOREIGN PATENT DOCUMENTS

| | | |
|---|---|---|
| JP | 2016144563 A | 8/2016 |
| KR | 20090131434 A | 12/2009 |
| KR | 101028359 B1 | 4/2011 |
| KR | 101093108 B1 | 12/2011 |
| KR | 201 50051790 A | 5/2015 |

OTHER PUBLICATIONS

Search Report dated Jan. 9, 2019 for PCT Application No. PCT/KR2018/011730.

* cited by examiner

```
<html>
<head>
<meta name="viewport" content="initial-scale=1.0, user-scalable=no"/>
<script type="text/javascript">
...
function SetWait(Time) { ... }
function SrvOn( ) { ... }
function LineCommand(lineCount) { ... }
function ExceptionCheck( ) { . . . }
...
function SrvSetParam(Key, Val)
{
Exception Check( ) ;
document.getElementById('SrvSetParam').value = Key + "|" + Val;
document.getElementById('SrvSetParam').click( );
return document.getElementById('retSrvSetParam').value;
}
function SendToLog (Tag, Detail)
{
ExceptionCheck( );
document.getElementById ('SendToLog').value = Tag + "|" + Detail;
document.getElementById ('SendToLog').click( );
}
</script>
```

↓ FROM FIG. 7A

```
<script>
function LoRa_Server_Setting( )
{
var bUdpServerOn = SrvOn ( ) ;
LineCommand(4); SetWait (5000) ;
LineCommand(5); SrvSetParam("DEVADDR" , "48000000");
LineCommand(6); SrvSetParam("NETWORKID" , "240000");
LineCommand(7); SrvSetParam,("APPNONCE" , "010203");
}
function main( )
{
LineCommand(22); SendToLog ("Init LoRa server and set.. ");
LineCommand(23); LroRa_Server_Setting ( );
LineCommand(24); SendToLog ("Now a test is available...");
}
</script>
...
<input type="hidden" name="SendToLog" ID="SendToLog">
<input type="hidden" name="SrvSetParam" ID="SrvSetParam">
<input type="hidden" name="retSrvSetParam" ID="retSrvSetParam">
...
</head>
<body onload="main( )">
</body>
</html>
```

720 { (script block)
730 — SendToLog input
740 — SrvSetParam input
750 — retSrvSetParam input
760 { body/html block

SCHEME FOR TEST AUTOMATION

This application is a National Phase entry of International Application No. PCT/KR2018/011730, filed on Oct. 4, 2018, which claims priority to and the benefit of Korean Patent Application No. 10-2017-0173705, filed on Dec. 16, 2017, the disclosure of which is incorporated herein by reference in its entirety.

TECHNICAL FIELD

Embodiments of the present invention relate to a scheme for test automation, and more particularly, to a method performed on a test automation platform, a device for test automation, and a computer-readable storage medium.

BACKGROUND ART

An automated test of a device is very beneficial to a device developer in terms of time and cost savings, convenience in testing, and facilitation in problem identification.

In-depth device testing may require high-priced systems. This is because, for example, the support of natural language-level developed languages, including conditional statements, repetitive statements, and the like, would be desirable for such testing. In this regard, as intended by the device disclosed in Korean Patent Publication No. 10-1028359, more economical and more efficient test techniques have been pursued.

However, according to the various conventional embedded test automation techniques, it is not possible to change a test script as desired by a user, and it is difficult to accurately control complicated multi-stage test conditions. Platform-based test automation techniques have been released to give some degree of freedom in changing the test script, but these techniques also have inherent limitations.

Regretfully, a large number of platform-based tests are currently targeting only smart phones and Windows programs. In particular, taking into account that internet of things (IoT) devices, which have recently been spotlighted, need to operate in conjunction with all of the various instruments, gateways, equipment, and the like for automated tests, the conventional test automation techniques are highly likely to be unsuitable therefor.

Therefore, there is a need to improve the test automation techniques.

DISCLOSURE

Technical Problem

Improved techniques for test automation are disclosed herein.

Technical Solution

According to at least one embodiment, a method performed by a computing device on a test automation platform includes: generating a markup language document from a test script, (the test script being created in a script language to include a definition of a user-defined function for use in testing a device under test (DUT), the markup language document including a script element for inserting the definition into the markup language document); and running a program engine for processing the generated markup language document, (the program engine being an off-the-shelf component of the test automation platform and including an interpreter for the script language).

The method may further include receiving a user input for inputting the test script into the test automation platform to generate the markup language document.

The script language may conform to JavaScript standards, and the markup language document may have a hypertext markup language (HTML) format.

The program engine may include a web view engine. The web view engine may be configured to parse the markup language document and execute the markup language document by using the interpreter in executing the script element and an HTML element for inserting a JavaScript code into the markup language document.

The user-defined function may include a first script statement for calling a predefined function available to the test script according to an external application programming interface (API) for the test automation platform.

The predefined function may be declared in another script element within the markup language document in the script language according to the external API.

The generating of the markup language document from the test script may include: identifying a designated location in the test script; and generating a third script statement for calling another predefined function which is available to the test script according to the external API to emulate a breakpoint at the designated location but is not included in the test script, and incorporating the third script statement into the script element. The another predefined function may be declared in the another script element in the script language according to the external API.

The method further include executing an internal function corresponding to the predefined function based on an internal API for the test automation platform (the internal function being callable within the test automation platform based on the internal API).

The generating of the markup language document from the test script may include generating an additional element associated with the predefined function and incorporating the additional element into the markup language document. The additional element may have an attribute corresponding to the predefined function, and the declaration may include a second script statement for triggering an event for the additional element. The method may further include: identifying an event handler corresponding to the attribute for the triggered event (the event handler being available within the test automation platform according to an internal API for the test automation platform and being configured to call an internal function); and executing the internal function by executing the event handler based on the additional element.

The generating of the markup language document from the test script may include: determining, based on the test script, whether a name of the user-defined function is the same as a predetermined name; and generating an additional element enabling the user-defined function to be executed, in response to the determination that the name of the user-defined function is the same as the predetermined name, and incorporating the additional element into the markup language document.

According to at least one embodiment, a device for test automation includes: a processor; and a computer-readable storage medium having computer executable instructions stored thereon for allowing the processor to perform operations so as to implement a test automation platform, when executed by the processor, the operations including: generating a markup language document from a test script (the test script being created in a script language to include a definition of a user-defined function for use in testing a device under test (DUT), the markup language document including a script element for inserting the definition into the markup language document); and running a program engine for processing the generated markup language document (the program engine being an off-the-shelf component of the test automation platform and including an interpreter for the script language).

The operations may further include receiving a user input for inputting the test script into the test automation platform to generate the markup language document.

The script language may conform to JavaScript standards, and the markup language document may have a hypertext markup language (HTML) format.

The program engine may include a web view engine. The web view engine may be configured to parse the markup language document and execute the markup language document by using the interpreter in executing the script element and an HTML element for inserting a JavaScript code into the markup language document.

The user-defined function may include a first script statement for calling a predefined function available to the test script according to an external application programming interface (API) for the test automation platform.

The predefined function may be declared in another script element within the markup language document in the script language according to the external API.

The generating of the markup language document from the test script may include: identifying a designated location in the test script; and generating a third script statement for calling another predefined function which is available to the test script according to the external API to emulate a breakpoint at the designated location but is not included in the test script, and incorporating the third script statement into the script element. The another predefined function may be declared in the another script element in the script language according to the external API.

The operations further may include executing an internal function corresponding to the predefined function based on an internal API for the test automation platform (the internal function being callable within the test automation platform based on the internal API).

The generating of the markup language document from the test script may include generating an additional element associated with the predefined function and incorporating the additional element into the markup language document. The additional element may have an attribute corresponding to the predefined function, and the declaration may include a second script statement for triggering an event for the additional element. The operations may further include: identifying an event handler corresponding to the attribute for the triggered event (the event handler being available within the test automation platform according to an internal API for the test automation platform and being configured to call an internal function); and executing the internal function by executing the event handler based on the additional element.

The generating of the markup language document from the test script may includes: determining, based on the test script, whether a name of the user-defined function is the same as a predetermined name; and generating an additional element enabling the user-defined function to be executed, in response to the determination that the name of the user-defined function is the same as the predetermined name, and incorporating the additional element into the markup language document.

According to at least one embodiment, there is provided a computer-readable storage medium having computer executable instructions stored thereon for allowing a processor to perform any one of the above-described methods, when executed by the processor.

Advantageous Effects

According to an embodiment of the present invention, application programming interfaces (APIs) for testing various devices may be provided on a computing platform for automated testing in a script language used for creating a test script, thereby making it possible to develop a test script desired by a user in a more convenient and free manner.

According to an embodiment of the present invention, a test script debugging (e.g., tracing) function may be provided on a computing platform for automated testing.

MODE FOR INVENTION

Hereinafter, embodiments of the present invention will be described in detail with reference to the accompanying drawings. The present invention may have various embodiments, some of which will be disclosed herein. However, it should be understood that the embodiments are provided as examples, not to limit the present invention, and the embodiments cover all modifications, equivalents, or alternatives falling within the spirit and scope of the present invention. Specific details are provided in the following detailed description to assist in a comprehensive understanding of methods, devices and/or systems according to the embodiments disclosed herein, and some of the embodiments may be implemented without some or all of these details. Also, detailed descriptions of well-known techniques may be omitted so as not to unnecessarily obscure various aspects of the present invention.

The terms used hereinafter are provided only to describe specific embodiments, and are not intended to be considered in a restrictive sense. Singular expressions include plural expressions unless expressly stated otherwise. In addition, it should be understood that the term "comprise", "have", or the like when used herein, specifies the presence of some features, numbers, steps, operations, elements, information, or combinations thereof, but does not preclude the presence or possibility of one or more other features, numbers, steps, operations, elements, information, or combinations thereof.

Figure 1:
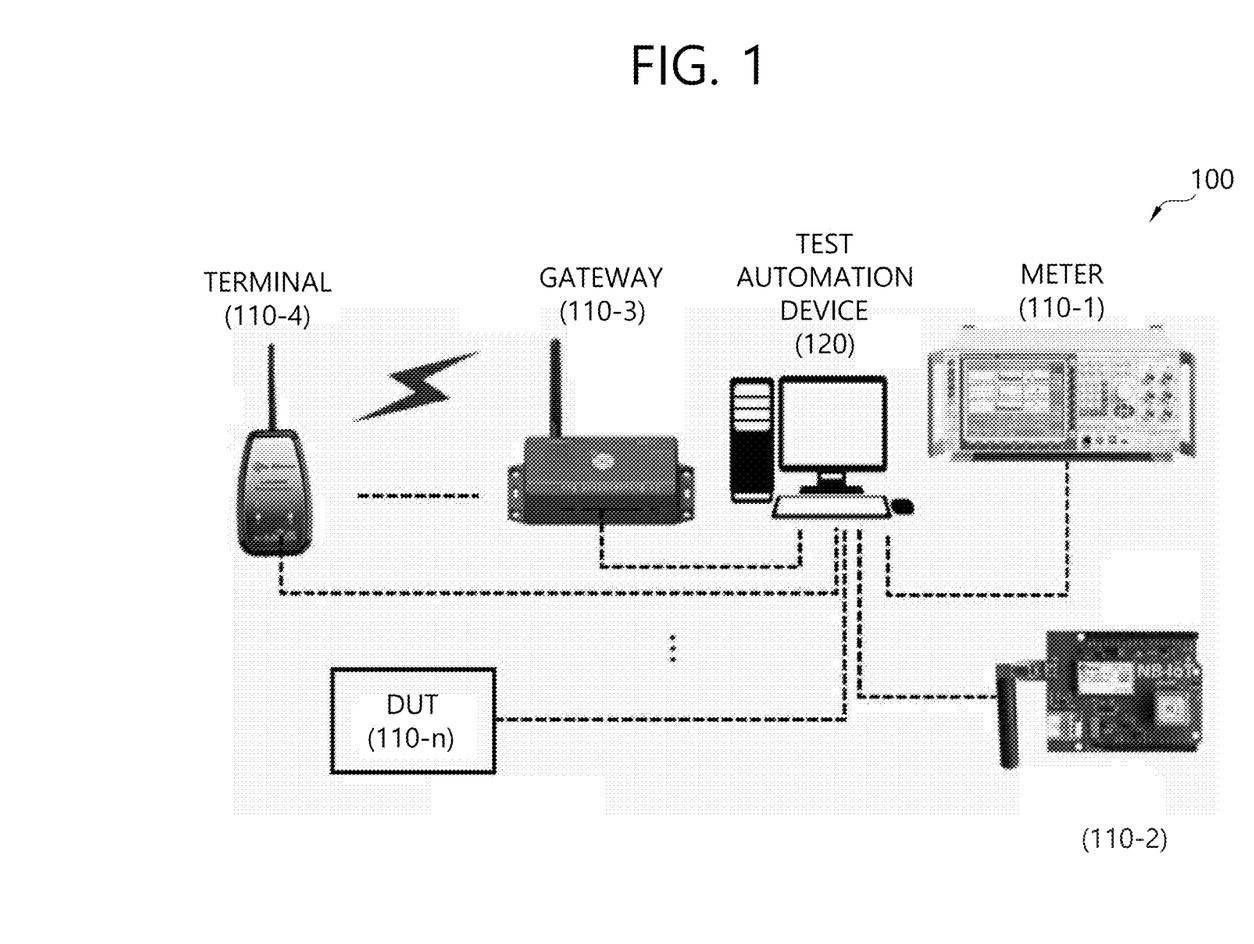
FIG. 1 schematically illustrates an environment 100 in which an automated test of a device under test (DUT) is performed according to an embodiment of the present invention.

FIG. 1 schematically illustrates an environment 100 in which an automated test of a device under test (DUT) is performed according to an embodiment of the present invention.

As illustrated, the exemplary environment 100 may include one or more DUTs 110-1, 110-2, 110-3, 110-4, . . . , and 110-n, such as a meter 110-1, a circuit board 110-2, a gateway 110-3, a terminal 110-4 and/or other DUTs 110-n (hereinafter, reference numeral 110 may denote the DUTs either individually or collectively), and a device 120 for test automation of the DUTs 110.

In addition, the DUTs 110 and the test automation device 120 are communicatively coupled. As an example, each DUT 110 may be communicatively coupled to the test automation device 120 via a wired transmission medium (e.g., a serial cable) as illustrated. In another example, each DUT 110 may be communicatively coupled to the test automation device 120 via a wireless transmission medium (e.g., an electromagnetic wave for wireless communication) or via a combination of the wired transmission medium and the wireless transmission medium. In some embodiments, the test automation device 120 may include an interface or a protocol stack for communication with the DUT 110.

Furthermore, according to an embodiment, some DUTs 110 may be communicatively coupled to each other via a wired transmission medium (e.g., a radio frequency (RF) cable or a coaxial cable), via a wireless transmission medium, or via a combination thereof as illustrated.

Figure 2:
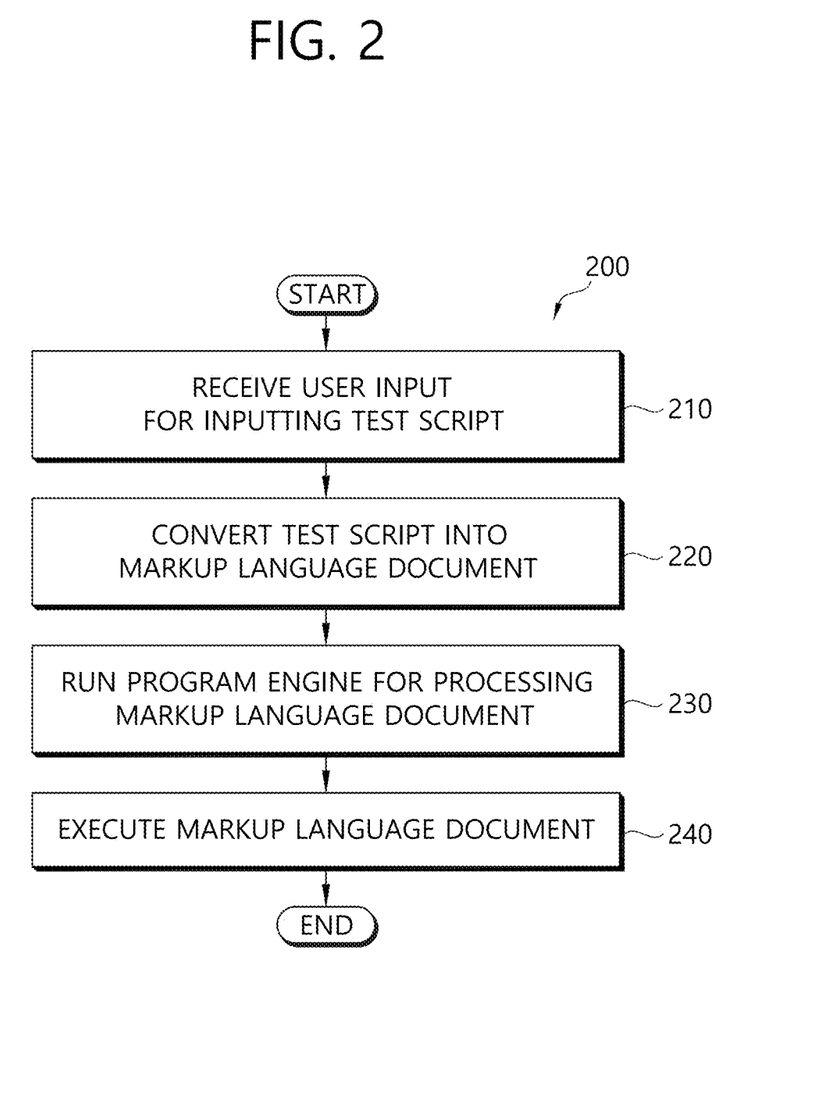
FIG. 2 is a diagram for explaining operations of a test automation device according to an embodiment of the present invention.

Referring now to FIG. 2, in some embodiments, it is illustrated that the test automation device 120 operates as will be described below to automatically test the DUT. It should be noted that the process 200 illustrated in FIG. 2 is provided merely as an example, and in some other embodiments, some of the operations in the process 200 of FIG. 2 may be omitted and/or another operation may be added.

The exemplary process 200 starts with implementation or running of a computing platform (hereinafter the computing platform may also be referred to as a "test automation platform") on the on test automation device 120. A subsequent operation after the process 200 may be performed on the computing platform provided by the test automation device 120.

In operation 210, the test automation device 120 receives a user input for inputting a test script into the test automation platform.

The test script may be created in a script language to include a definition of any function which may be defined by a user for use in testing the DUT 110. The user-defined function may include a script statement for calling a predefined function (e.g., a built-in function that is basically provided in the test automation platform and is available within the test automation platform at all times), the predefined function being available to the test script according to an external application programming interface (API) (which is accessible from the script language) for the test automation platform. It should be noted that the test script does not include a definition of the predefined function. In some embodiments, the test script may be created in a script language that conforms to JavaScript standards (e.g., a JavaScript file).

In operation 220, the test automation device 120 converts the test script into a markup language document. For example, the test automation device 120 may read the test script and generate a markup language document from the test script.

In some embodiments, the generated markup language document may include a script element for inserting the definition of the user-defined function in the test script into the markup language document. As an example, the markup language document may have a hypertext markup language (HTML) format (e.g., an HTML file), and the above-described script element in the markup language document may be an HTML element including a start tag "<script>", an end tag "</script>", and a script code inserted therebetween (including the definition of the user-defined function).

In some embodiments, the generating of the markup language document from the test script may include: determining, based on the test script, whether a name of the user-defined function is the same as a predetermined name (e.g., "main"); and generating an additional element enabling the user-defined function to be executed prior to execution of another function, in response to the determination that the name of the user-defined function is the same as the predetermined name, and incorporating the additional element into the markup language document. As an example, the markup language document may have an HTML format, and the above-described additional element in the markup language document may be an HTML element as follows.

<body onload="main( )">
</body>

Once interpreted (and then executed), this element enables the main( ) function to be executed first among functions in an HTML document including such an HTML element. Thus, the main( ) function may be considered as a kind of entry point function. This feature would be advantageous for the test automation platform according to the embodiment, because the test script is required to include an entry point function for testing a DUT although JavaScript, which lacks a mechanism for mandatorily specifying an entry point, is used to create the test script. Accordingly, in some embodiments, a function having a specific name, for example the main( ) function, may be specified as being necessarily included in the test script.

Additionally or alternatively, the generating of the markup language document from the test script may include other operations, which will be described in more detail below in connection with operation 240.

In operation 230, the test automation device 120 runs a program engine for processing the generated markup language document, the program engine including an interpreter for the script language used in creating the test script, such as a JavaScript interpreter.

In some embodiments, the program engine may be an off-the-shelf component of the test automation platform (e.g., a commercial non-custom made component that is not customized for the test automation platform). As an example, the program engine may include an off-the-shelf web view engine, for example an Internet Explorer (IE) engine, hosted/provided by an underlying operating system (OS) of the test automation platform (e.g., a commercial OS such as Windows of Microsoft Corporation or MacOS of Apple Inc., or an open source-based OS such as Linux). The web view engine may be configured to parse the HTML document and execute an HTML document by using the JavaScript interpreter in executing the HTML element for inserting a JavaScript code (e.g., the definition of the user-defined function as mentioned above) into the HTML document.

Direct interpretation of the test script, for example self-interpretation of the test script that is created in JavaScript, requires a development of a JavaScript engine, which is relatively high in complexity. Instead, the test script may be converted into the markup language document and the converted markup language document may be conveyed to the program engine, which is an off-the-shelf component of the test automation platform, as described above, thereby enabling a convenient and cost-effective automated test.

In operation 240, the test automation device 120 interprets (and then executes) the markup language document to test the DUT. As mentioned above, the markup language document (e.g., the HTML document including the JavaScript code) may be executed by the program engine (e.g., the web view engine).

For example, a certain user-defined function defined in the script element of the markup language document as described above may be executed. In particular, the user-defined function having the same name as the predetermined name may be executed as an entry point function earlier than the other functions.

In addition, in connection with execution of a first script statement for calling a predefined function in the user-defined function, exemplary operations performed by the test automation device 120 in some embodiments will be described below.

First, the markup language document generated from the test script in operation 220 may further include another script element. The predefined function called in the first script statement may be declared in the script language in the another script element according to the external API for the test automation platform. As an example, all predefined functions available within the test script according to the external API or a predefined function identified from the script statement within the test script among them may be declared in the another script element of the markup language document. Alternatively or additionally, however, all or some of the predefined functions may be declared in the script element where user-defined functions are defined. In this case, it should also be noted that the definition of the user-defined functions and the declaration of the predefined functions may be partitioned to be separate from each other (e.g., by an inserted comment) within the same script element. The markup language document may have a HTML format, and the above-described another script element in the markup language document may be an HTML element including a start tag "<script>", an end tag "</script>", and a script code inserted therebetween (including the declaration of the predefined function).

When the predefined function basically provided on the test automation platform is declared in the markup language document, the test automation device 120 may interpret (and then execute) the predefined function while interpreting (and then executing) the markup language document in operation 240.

Furthermore, following the executing of the predefined function, the test automation device 120 may execute an internal function (which can be called only within the test automation platform based on an internal API for the test automation platform) corresponding to the predefined function based on the internal API. In some embodiments, the internal API may be accessible from a language other than the script language used for creating the test scrip (e.g., a compiled programming language).

To this end, the generating of the markup language document from the test script in operation 220 may include generating an additional element associated with the pre-defined function (e.g., either by identifying the predefined function from the first script statement, or as is the case with all or some of the other functions available within the test script according to the external API) and incorporating the additional element into the markup language document. The additional element may have an attribute corresponding to the predefined function, such as an identifier (which may hereinafter be abbreviated as "ID"). In particular, the declaration of the predefined function in the markup language document may include a second script statement for triggering an event for the additional element. Accordingly, the test automation device 120 may trigger the event by executing the predefined function while executing the markup language document in operation 240. As an example, the event may be a click event. For the triggered event, the test automation device 120 may also identify an event handler corresponding to the above-described attribute of the additional element, and execute an internal function by executing the event handler based on the additional element. The event handler is available only within the test automation platform according to the internal API for the test automation platform and may be configured to call an internal function.

More specifically, the above-described additional element may be an input element enabling an input of data associated with the predefined function (e.g., an argument of the predefined function or a return value of the internal function corresponding to the predefined function). As an example, the first script statement may be a code created in JavaScript as follows.

SendToLog ("Now a test is available . . . ");

Further, the markup language document may have an HTML format. When the name of the predefined function is "SendToLog" as exemplified above, the above-described input element in the markup language document may be an HTML element as follows.

<input       type="hidden"       name="SendToLog" ID="SendToLog">

In addition, the internal function corresponding to the predefined function may take an argument of the predefined function as an input and return a return value. The declaration of the predefined function in the markup language document may include data associated with the predefined function, for example a script statement for inputting an argument of the predefined function into the input element, and/or other data associated with the predefined function, for example a script statement for reading and returning a return value of the internal function corresponding to the predefined function from the input element.

Furthermore, it is possible to emulate a breakpoint at a particular location of the test script for testing the DUT (e.g., at a line location designated by the user or the test automation platform), by using the execution of the predefined function and the internal function as described above. Accordingly, the test script may be executed at a designated location, for example, line by line. This feature may promote convenient debugging (e.g., a trace function) on the test automation platform.

In some embodiments, the test automation device 120 identifies a location designated as a breakpoint. The test automation device 120 may also generate a script statement for calling a specific predefined function according to the external API for the test automation platform (which is available to the test script according to the external API to temporarily stop the execution of the markup language document at the breakpoint, but is not included in the test script) and incorporate the generated script statement into the markup language document immediately before a certain script statement of the user-defined function. Furthermore, the test automation device 120 may declare the specific predefined function in a script element containing a declaration of another predefined function according to the external API in the script language used for creating the test script. Rather than the specific predefined function itself, the internal function corresponding thereto is more involved in the actual emulation task.

Figure 3:
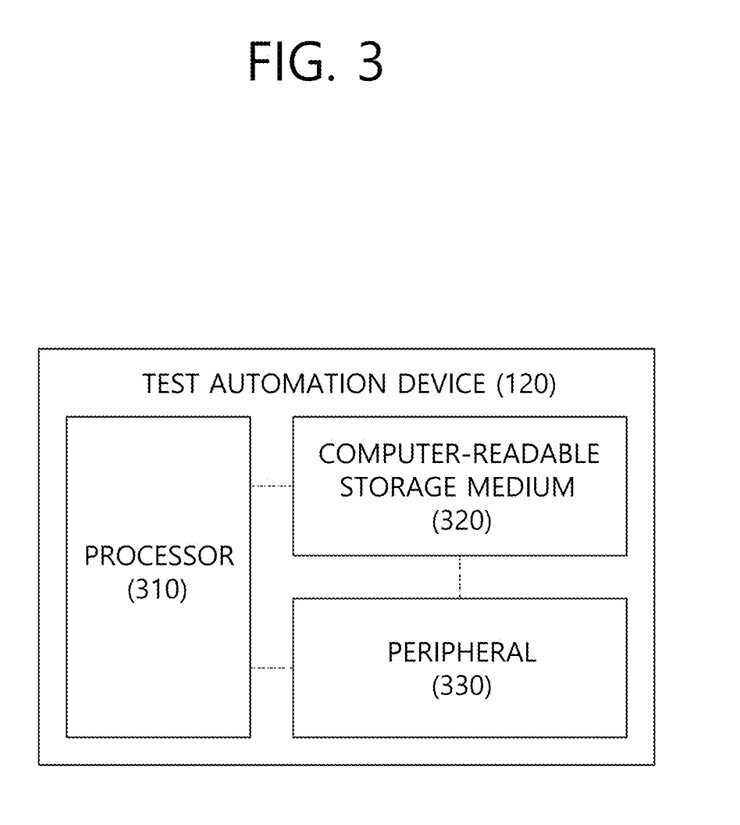
FIG. 3 is a schematic block diagram of an exemplary test automation device suitable for an embodiment of the present invention.

FIG. 3 is a schematic block diagram of an exemplary test automation device 120 suitable for an embodiment of the present invention. The test automation device 120 may be any suitable type of computing device. Referring to FIG. 3, it is exemplified that the test automation device 120 includes at least one processors 310, a computer-readable storage medium 320 that is readable by the processor 310, and various peripherals 330.

The processor 310 may include processing circuitry for controlling operations of the test automation device 120. For example, the processor 310 may include a central processing unit (CPU), a graphics processing unit (GPU), a digital signal processor (DSP), a processor core, a microprocessor, a microcontroller, a field-programmable gate array (FPGA), an application specific integrated circuit (ASIC), a radio-frequency integrated circuit (RFIC), another hardware and logic circuitry, or any suitable combination thereof.

The computer-readable storage medium 320 may include any non-transitory computer-readable storage medium for storing computer executable instructions or program codes, program data and/or another suitable form of information in a computer readable form. For example, the computer-readable storage medium 320 may include a read-only memory (ROM), a random-access memory (RAM), a volatile memory, and a non-volatile memory, a removable memory, a non-removable memory, a hard disk, a flash memory, a magnetic disk storage medium, an optical disk storage medium, another storage device and storage medium, or any suitable combination thereof. In some embodiments, the processor 310 may execute the computer executable instructions stored on the computer-readable storage medium 320. When executed by the processor 310, the instructions may allow the processor 310 to perform operations according to an embodiment of the present invention, for example at least some operations of the above-described exemplary process.

The peripherals 330 may include various input/output (I/O) devices, which may be used for the test automation device 120 to communicate with other apparatus, devices, instruments, and the like, to receive user inputs of commands, data and/or information thereinto, and/or to present outputs therefrom to the user. For example, the peripherals 330 may include a pointing device such as a mouse, a keyboard, a keypad, a microphone, a liquid crystal display (LCD), a touch-sensitive display, a speaker, a printer, a communication interface card, a serial port, a universal serial bus (USB) port, a general purpose interface bus (GPIB) connector, and the like.

Figure 4:
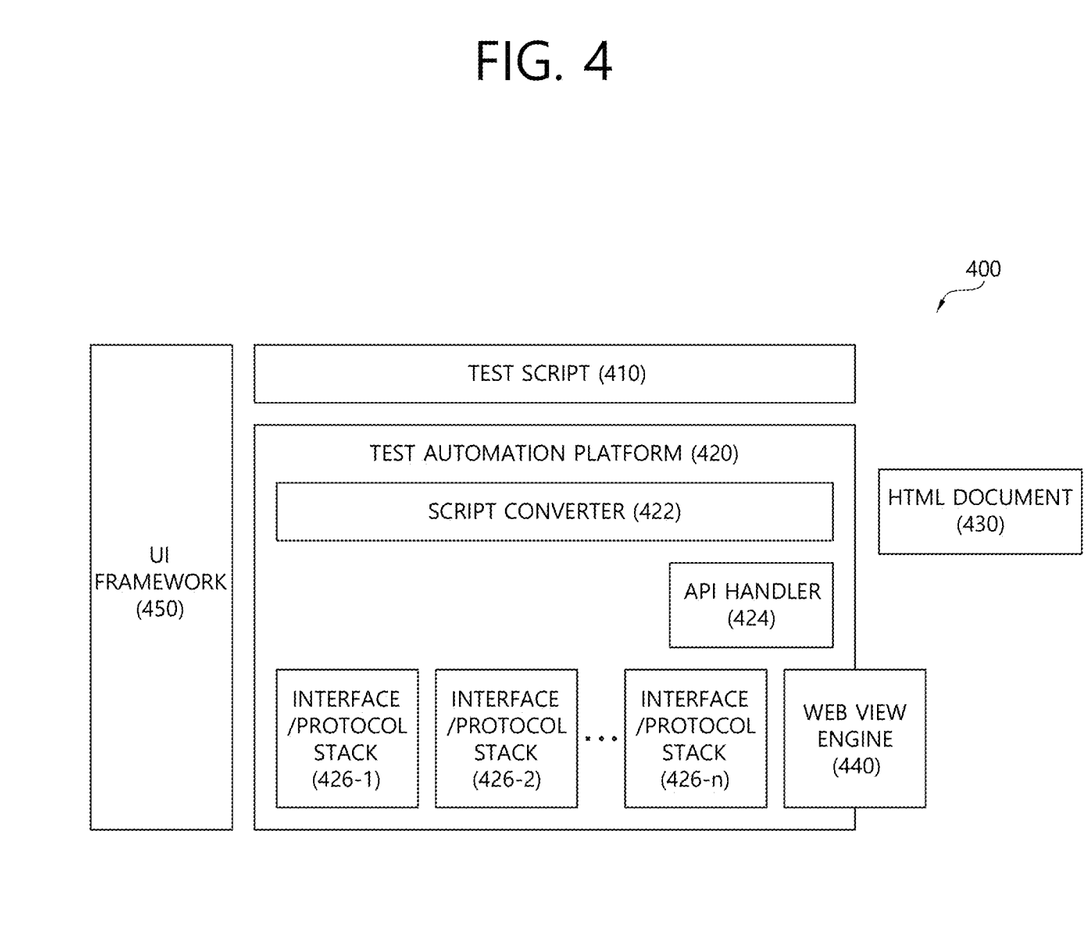
FIG. 4 schematically shows a system architecture of a test automation device according to an embodiment of the present invention.

FIG. 4 schematically shows a system architecture of a test automation device according to an embodiment of the present invention. As illustrated, the exemplary system architecture 400 includes a test automation platform 420. The test automation platform 420 includes a script converter 422, an API handler 424, and one or more interfaces and/or protocol stacks thereof 426-1, 426-2, . . . , and 426-n (hereinafter, reference numeral 426 may denote the interfaces and/or protocol stacks either individually or collectively). Additionally, the test automation platform 420 may include an off-the-shelf web view engine 440 (e.g., an IE engine), which may be provided by a commercial OS included in the platform 420 in some embodiments. The script converter 422 may be configured to convert an inputted test script 410 into an HTML document 430. The generated HTML document 430 may be conveyed to the web view engine 440. The web view engine 440 is capable of parsing and interpreting the HTML document, and interpreting a JavaScript code inserted into the HTML document using a JavaScript interpreter, thereby executing the HTML document. The web view engine 440 may be configured to trigger an event (e.g., a click event) upon execution of a predefined function described in the test script while interpreting the inserted JavaScript code. The API handler 424 may be configured to execute an internal function by identifying and executing an event handler mapped onto an identifier corresponding to the predefined function in response to the event being triggered. During the execution of the internal function, the API handler 424 may communicate with the DUT 110 for functional testing of the corresponding DUT 110 using one or more interfaces and/or protocol stacks 426 when needed.

Figure 5:
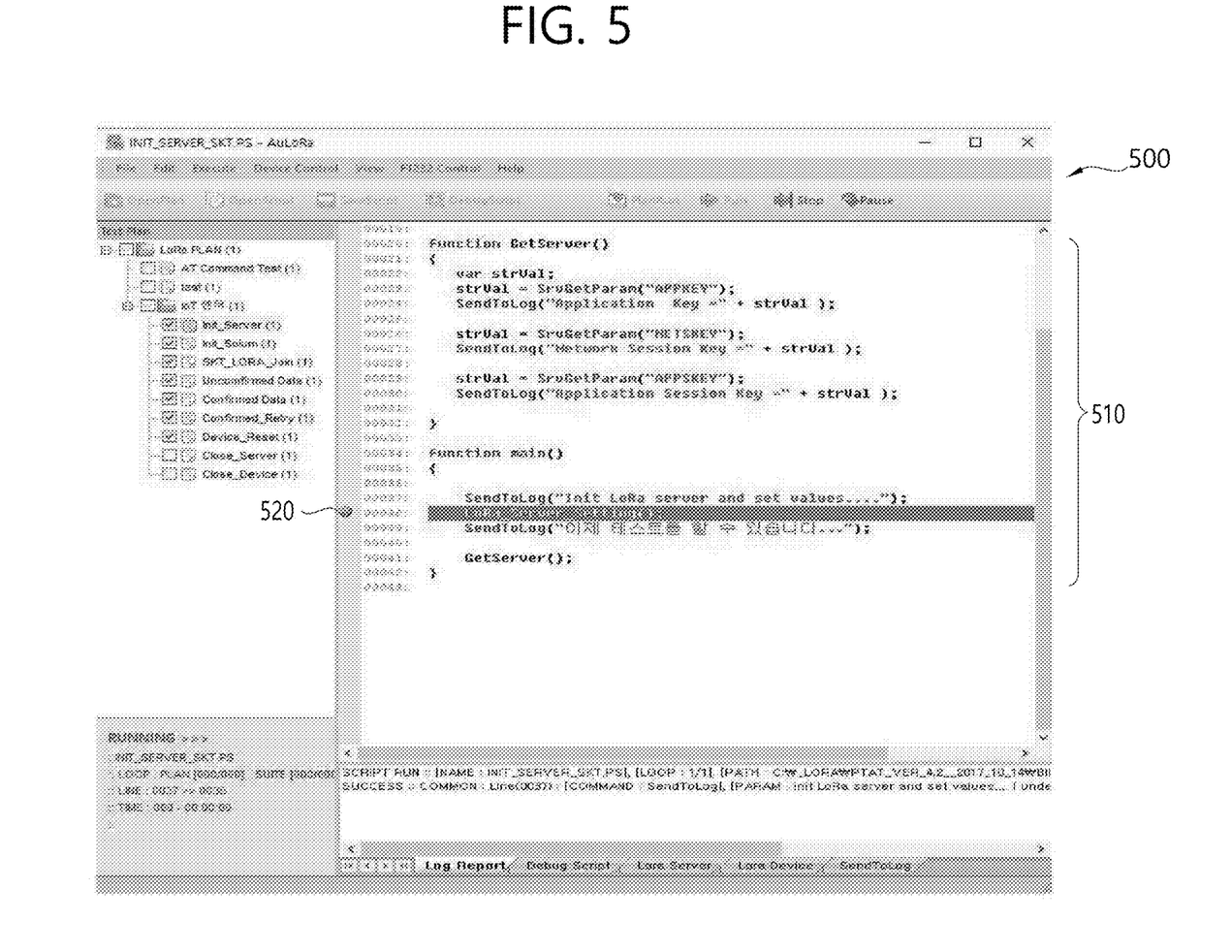
FIG. 5 illustrates an exemplary graphic user interface (GUI) suitable for use in a process of testing a DUT on a test automation platform according to an embodiment of the present invention.

The system architecture 400 may further include a user interface (UI) framework 450. The UI framework 450 includes a software tool that may be run on the test automation platform 420 to be helpful in building a program for providing a UI (e.g., a graphic UI (GUI)). By using the UI framework 450, the test automation platform 420 may provide a UI suitable for use in the process of testing the DUT, for example a UI for inputs and/or outputs to/from the test automation platform 420. For example, the test automation platform 420 may provide a GUI 500 visually presenting a test script 510 inputted by the user and a breakpoint 520 designated by the user as illustrated in FIG. 5.

Figure 6:
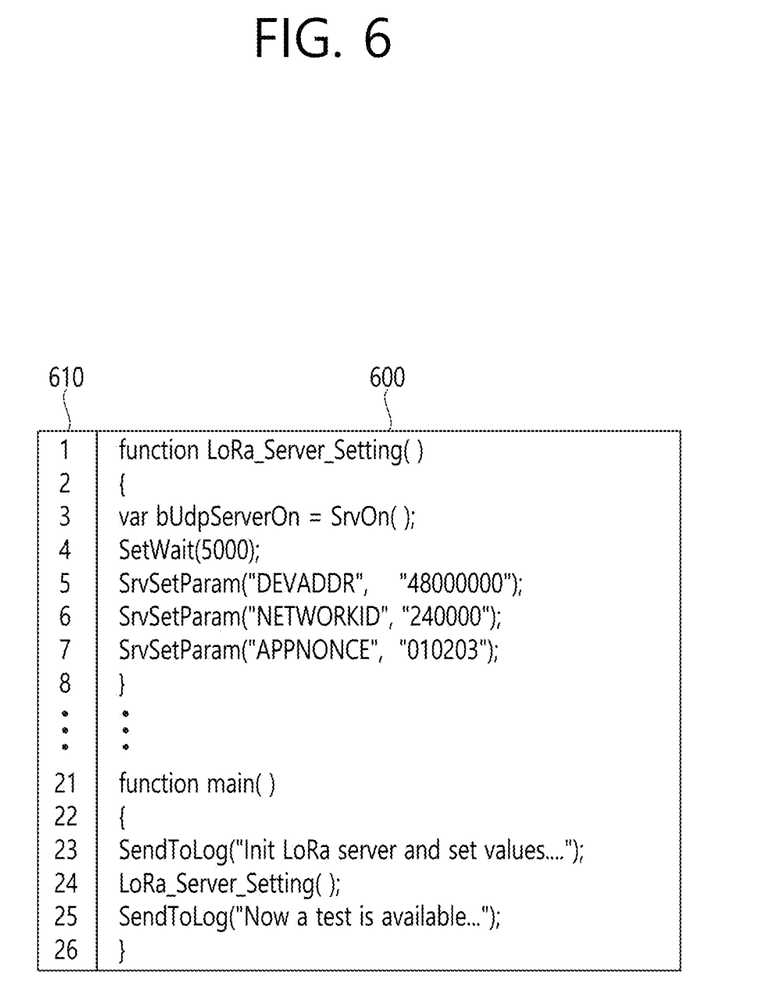
FIG. 6 schematically shows an exemplary test script created in JavaScript according to an embodiment of the present invention.
Figure 7A:
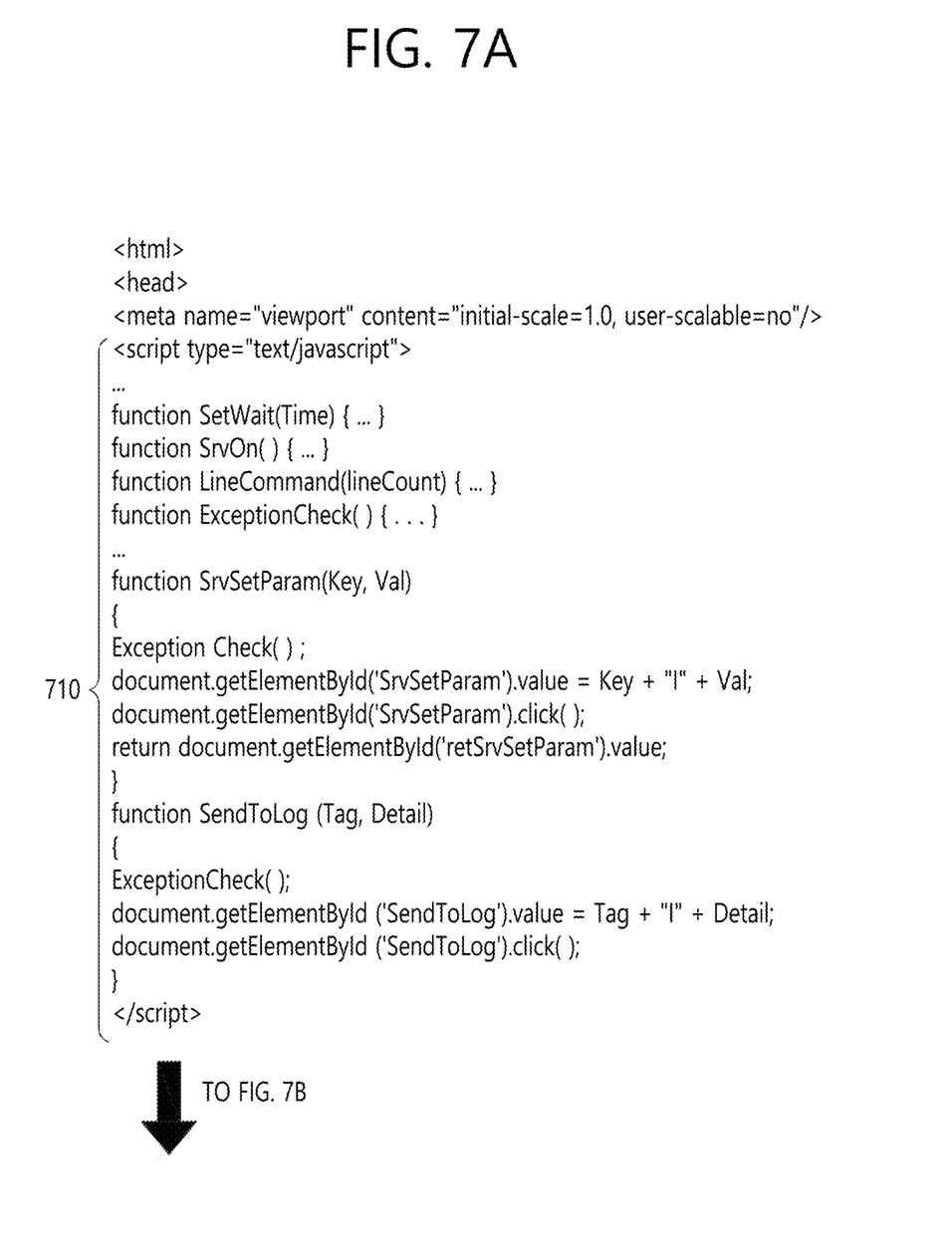
FIGS. 7A and 7B schematically show an exemplary HTML document generated in JavaScript from a test script according to an embodiment of the present invention.
Figure 7B:
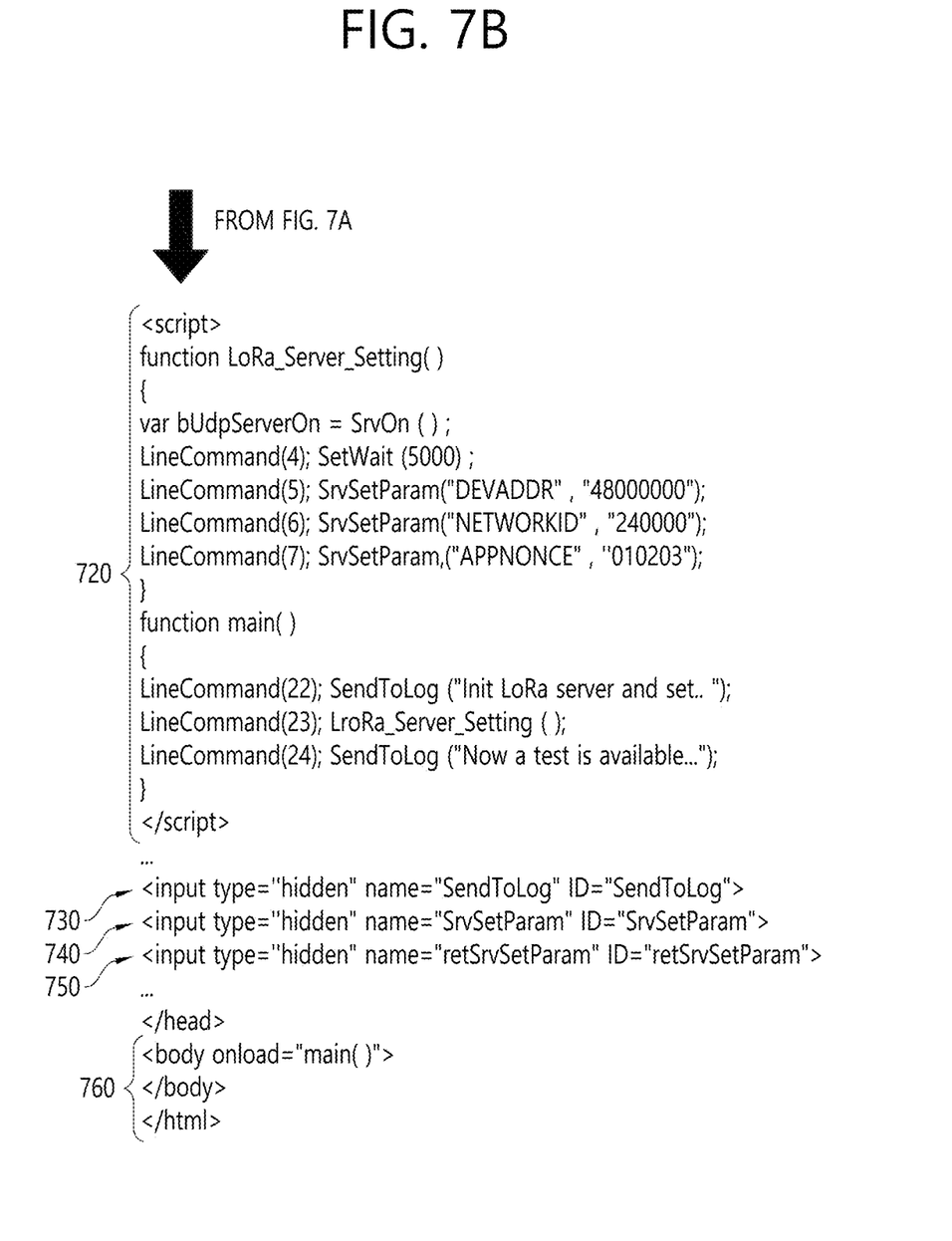

FIG. 6 schematically shows an exemplary test script created in JavaScript according to an embodiment of the present invention, and FIGS. 7A and 7B schematically show an exemplary HTML document generated in JavaScript from a test script according to an embodiment of the present invention.

In FIG. 6, the exemplary test script 600 is illustrated together with a code line number 610 for each line. The test script 600 created in JavaScript includes two user-defined functions, main( ) and LoRa_Server_Setting( ) The function main( ) includes two script statements (see lines 23 and 25) for calling a predefined function SendToLog( ) and one script statement (see line 24) for calling the user-defined function LoRa_Server_Setting( ) The function LoRa_Server_Setting( ) includes one script statement (see line 3) for calling a predefined function SrvOn( ) one script statement (see line 4) for calling a predefined function SetWait( ), and three script statements (see lines 5 to 7) for calling a predefined function SrvSetParam( ).

The HTML document exemplified in FIGS. 7A and 7B is generated from the test script 600 of FIG. 6 according to an embodiment. As described above, the declaration of the predefined functions in the test script 600 is included in a first script element 710 of the HTML document. For example, all predefined functions available to the test script 600 according to the external API that is accessible in JavaScript are declared in the first script element 710 in JavaScript according to the external API. For convenience, the declaration of SrvSetParam( ) and SendToLog( ) of the aforementioned predefined functions above is exemplified in more detail in FIG. 7A. As declared, the function SrvSetParam(Key, Val) is a function for setting a server-side parameter indicated by Key as a value of Val, and the function SendToLog(Tag, Detail) is a function for logging Tag and Detail, the Detail being optional. The both functions call a predefined function ExceptionCheck( ) which is also declared in the first script element 710.

As described above, the definition of the user-defined functions in the test script 600 is included in a second script element 720 of the HTML document. For example, the second script element 720 includes all script statements for each of the two user-defined functions in the test script 600, main( ) and LoRa_Server_Setting( ) Also, a script statement for calling a predefined function LineCommand( ) is inserted immediately before each of the script statements for calling the predefined functions included in each of the user-defined functions. The function LineCommand( ) is also declared in the first script element 710. As declared, the function LineCommand(lineCount) is a function for emulating a breakpoint on a lineCount-th line of the test script. The script statement located immediately after the script statement for calling LineCommand(lineCount) is the same as that on the lineCount-th line of the test script.

As described above, the HTML document includes an element 760 enabling the function main( ) which is specified as an entry point function, to be executed first. When the HTML document is executed, the test of the DUT may start with the execution of the function main( ).

As described above, the HTML document includes a hidden input element (e.g., input elements 730, 740 and 750) having an ID attribute. Referring to FIG. 7A, the functions SrvSetParam( ) and SendToLog( ) declared in the first script element 710 use a method of the document object model (DOM), document.getElementById( ) According to this method, if an ID attribute is given, an element having that ID attribute is returned. In particular, it will be appreciated that the functions SrvSetParam( ) and SendToLog( ) obtain their elements on the basis of the ID attributes of the input elements among the input elements 730, 740 and 750 exemplified in FIG. 7B.

Accordingly, as declared in the first script element 710, the function SrvSetParam(Key, Val) includes a script statement for inputting Key and Val into the input element 740 having the ID "SrvSetParam" to convey its arguments Key and Val to a corresponding internal function, and a script statement for reading a return value of the internal function from the input element 750 having the ID "retSrvSetParam" and returning the return value thereto. Also, the function SendToLog(Tag, Detail) also includes a script statement for inputting Tag and Detail to the input element 730 having the ID "SendToLog" to convey its arguments Tag and Detail to a corresponding internal function.

Above all, the functions SrvSetParam( ) and SendToLog( ) declared in the first script element 710 include a script statement for triggering a click event for the element returned by the method document.getElementById( ) Hereinafter, it will be described as an example how the test automation platform operates in response to the event being triggered.

In some embodiments, the IE engine may be used as a web view engine for executing an HTML document, as described above. For rendering of a web page based on such execution, a CDHtmlDialog class of Microsoft foundation class (MFC) or a derived class inherited therefrom, for example a CJSParserDlg class defined as follows, may be used.

```
Class CJSParserDlg : public CDHtmlDialog
{
    DECLARE_DYNCREATE(CJSParserDlg)
Public:
    CJSParserDlg(CWnd* pParent = NULL);
    Virtual ~CJSParserDlg( );
    ...
    HRESULT SendToLog(IHTMLElement *pElement);
    HRESULT SrvSetParam(IHTMLElement *pElement);
    ...
}
```

As shown above, the CJSParserDlg class has event handlers SendToLog( ) and SrvSetParam( ) The event handlers are available within the test automation platform according to an internal API that is accessible from C++.

Also, in order to capture events associated with the HTML elements, an event map for the CJSParserDlg class may be configured as follows.

```
BEGIN_DHTML_EVENT_MAP(CJSParserDlg)
    ...
    DHTML_EVENT_ONCLICK(_T("SrvSetParam"), SrvSetParam)
    DHTML_EVENT_ONCLICK(_T("SendToLog"), SendToLog)
    ...
END_DHTML_BVENT_MAP( )
```

According to the above event map, the event handler SrvSetParam( ) corresponds to an HTML element having the ID "SrvSetParam", and the event handler SendToLog( ) corresponds to an HTML element having the ID "SendToLog". Further, the SrvSetParam( ) and SendToLog( ) of the CJSParserDlg class may be given as follows.

```
HRESULT CJSParserDlg::SrvSetParam(IHTMLElement *pElement)
{
    ...
    GetElement("SrvSetParam", &pElement);
    pElement->getAttribute (L"value", 2, &vData);
    ...
    BOOL bRet =
        m_ScrUserCmd.srvSetParam(vData.FirstValue,
    vData.SecondValue);
    ...
    GetElement("retSrvSetParam", &psrcElement);
    psrcElement->setAttribute(L"value", (VT_BSTR)bRet);
    return 0;
}
HRESULT CJSParserDlg::SendToLog(IHTMLElement *pElement)
{
    ...
    GetElement("SendToLog", &pElement);
    pElement->getAttribute(L"value", 2, &vData);
    ...
    m_ScrUserCmd.SendToLog(vData.FirstValue,
    vData.SecondValue);
    return 0;
}
```

As shown above, the event handler SrvSetParam( ) gets a value of the value attribute of the input element 740 having the ID "SrvSetParam", executes an internal function m_ScrUserCmd.srvSetParam( ) and assigns a return value of the internal function to the value attribute of the input element 750 having the ID "retSrvSetParam". In addition, the event handler SendToLog( ) gets a value of the value attribute of the input element 730 having the ID "SendToLog" and executes an internal function m_ScrUserCmd.sendToLog( ).

An exemplary embodiment may be implemented as a computer-readable storage medium including a computer program on which the operations, techniques, processes, or any aspects or parts thereof described herein are embodied. The computer-readable storage medium may include program instructions, local data files, local data structures, and the like either alone or in combination. The program capable of implementing or utilizing the operations, techniques, processes, or any aspects or parts thereof disclosed herein may be implemented in any type (e.g., compiled or interpreted) of programming language that is executable by a computer, such an assembly, a machine language, a procedural language, or an object-oriented language, and may be combined with hardware implementation. The term "computer-readable storage medium" may include any medium capable of storing instructions (which allow the computing device to perform the technique disclosed herein, when executed) for execution by a computing device (e.g., the test automation device 120), and storing data structures used by or associated with the instructions. Examples of the computer-readable storage medium include a magnetic medium such as a hard disk, a floppy disk or a magnetic tape, an optical storage medium such as a CD-ROM or a DVD, a magnetic-optical medium such as a floptical disk, and a memory device such as a ROM, a RAM, a flash memory or a solid-state memory, but are not limited to.

While some embodiments of the present invention have been described in detail above, the embodiments should be considered as illustrative and not restrictive. Those skilled in the art will appreciate that various modifications may be made to the details of the embodiments disclosed herein without departing from the scope of the present invention. Therefore, the scope of the present invention should be defined by the appended claims and equivalents thereof, not limited to the embodiments described above.

The invention claimed is:

1. A method performed by a computing device on a test automation platform, the method comprising:
generating a markup language document from a test script, the test script being created in a script language to include a definition of a user-defined function for use in testing a device under test (DUT), the markup language document including a script element for inserting the definition into the markup language document;
running a program engine for processing the generated markup language document, the program engine being an off-the-shelf component of the test automation platform and including an interpreter for the script language; and
executing the generated markup language document,
wherein the generating of the markup language document from the test script includes:
determining, based on the test script, whether a name of the user-defined function is the same as a predetermined name; and
generating an additional element enabling the user-defined function to be executed, in response to the determination that the name of the user-defined function is the same as the predetermined name, and incorporating the additional element into the markup language document,
wherein the user-defined function includes a first script statement for calling a predefined function available to the test script according to an external application programming interface (API) for the test automation platform,
wherein when the predefined function provided is declared in the markup language document, the predefined function is interpreted and then executed while the test automation platform interprets and then executes the markup language document, and
wherein the definition of the user-defined function and the declaration of the predefined function are partitioned to be separate from each other within a same script element by an inserted comment.

2. The method of claim 1, further comprising receiving a user input for inputting the test script into the test automation platform to generate the markup language document.

3. The method of claim 1, wherein the script language conforms to JavaScript standards, and the markup language document has a hypertext markup language (HTML) format.

4. The method of claim 3, wherein the program engine includes a web view engine, the web view engine being configured to parse the markup language document and execute the markup language document by using the interpreter in executing the script element and an HTML element for inserting a JavaScript code into the markup language document.

5. The method of claim 1, wherein the predefined function is declared in another script element within the markup language document in the script language according to the external API.

6. The method of claim 5, wherein the generating of the markup language document from the test script further includes: identifying a designated location in the test script; and generating a third script statement for calling another predefined function which is available to the test script according to the external API to emulate a breakpoint at the designated location but is not included in the test script, and incorporating the third script statement into the script element, the another predefined function being declared in the another script element in the script language according to the external API.

7. The method of claim 1, further comprising executing an internal function corresponding to the predefined function based on an internal API for the test automation platform, the internal function being callable within the test automation platform based on the internal API.

8. The method of claim 1, wherein the generating of the additional element includes generating the additional element associated with the predefined function, the additional element having an attribute corresponding to the predefined function, a declaration of the predefined function including a second script statement for triggering an event for the additional element, and
the method further comprising:
identifying an event handler corresponding to the attribute for the triggered event, the event handler being available within the test automation platform according to an internal API for the test automation platform and being configured to call an internal function; and
executing the internal function by executing the event handler based on the additional element.

9. A computer-readable storage medium having computer executable instructions stored thereon for allowing a processor to perform the method of claim 1, when executed by the processor,
wherein the computer-readable storage medium includes one or more of a magnetic medium including a hard disk, a floppy disk, or a magnetic tape, an optical storage medium including a CD-ROM (Compact Disk-Read Only Memory) or a DVD (Digital Video Disc), a magnetic-optical medium including a floptical disk, and a memory device including a ROM (Read Only Memory), a RAM (Random Access Memory), a flash memory, or a solid-state memory.

10. A device for test automation, the device comprising:
a processor; and
a computer-readable storage medium having computer executable instructions stored thereon for allowing the processor to perform operations so as to implement a test automation platform, when executed by the processor, the operations including:
generating a markup language document from a test script, the test script being created in a script language to include a definition of a user-defined function for use in testing a device under test (DUT), the markup language document including a script element for inserting the definition into the markup language document;
running a program engine for processing the generated markup language document, the program engine being an off-the-shelf component of the test automation platform and including an interpreter for the script language; and
executing the generated markup language document,
wherein the generating of the markup language document from the test script includes:
determining, based on the test script, whether a name of the user-defined function is the same as a predetermined name; and
generating an additional element enabling the user-defined function to be executed, in response to the determination that the name of the user-defined function is the same as the predetermined name, and incorporating the additional element into the markup language document,
wherein the user-defined function includes a first script statement for calling a predefined function available to the test script according to an external application programming interface (API) for the test automation platform,
wherein when the predefined function provided is declared in the markup language document, the predefined function is interpreted and then executed while the test automation platform interprets and then executes the markup language document, and
wherein the definition of the user-defined function and the declaration of the predefined function are partitioned to be separate from each other within a same script element by an inserted comment.

11. The device of claim 10, wherein the operations further include receiving a user input for inputting the test script into the test automation platform to generate the markup language document.

12. The device of claim 10, wherein the script language conforms to JavaScript standards, and the markup language document has a hypertext markup language (HTML) format.

13. The device of claim 12, wherein the program engine includes a web view engine, the web view engine being configured to parse the markup language document and execute the markup language document by using the interpreter in executing the script element and an HTML element for inserting a JavaScript code into the markup language document.

14. The device of claim 10, wherein the predefined function is declared in another script element within the markup language document in the script language according to the external API.

15. The device of claim 14, wherein the generating of the markup language document from the test script further includes: identifying a designated location in the test script; and generating a third script statement for calling another predefined function which is available to the test script according to the external API to emulate a breakpoint at the designated location but is not included in the test script, and incorporating the third script statement into the script element, the another predefined function being declared in the another script element in the script language according to the external API.

16. The device of claim 10, where the operations further include executing an internal function corresponding to the predefined function based on an internal API for the test automation platform, the internal function being callable within the test automation platform based on the internal API.

17. The device of claim 10, wherein the generating of the additional element includes generating the additional element associated with the predefined function, the additional element having an attribute corresponding to the predefined function, a declaration of the predefined function including a second script statement for triggering an event for the additional element, and
the operations further including:
identifying an event handler corresponding to the attribute for the triggered event, the event handler being available within the test automation platform according to an internal API for the test automation platform and being configured to call an internal function; and
executing the internal function by executing the event handler based on the additional element.

* * * * *